United States Patent [19]

Schwarz

[11] 4,177,645
[45] Dec. 11, 1979

[54] PROCESS FOR ISOLATING DINITROGEN MONOXIDE

[75] Inventor: Hans-Helmut Schwarz, Krefeld, Fed. Rep. of Germany

[73] Assignee: Bayer Aktiengesellschaft, Leverkusen, Fed. Rep. of Germany

[21] Appl. No.: 923,507

[22] Filed: Jul. 10, 1978

[30] Foreign Application Priority Data

Jul. 16, 1977 [DE] Fed. Rep. of Germany ....... 2732267

[51] Int. Cl.² .............................................. F25J 3/06
[52] U.S. Cl. ........................................... 62/23; 62/38; 62/40; 423/400
[58] Field of Search ...................... 423/400; 62/23, 28, 62/31, 38, 39, 40

[56] References Cited

U.S. PATENT DOCUMENTS

| | | | |
|---|---|---|---|
| 947,323 | 1/1910 | Beeman | 426/400 |
| 3,358,460 | 12/1967 | Smith et al. | 62/38 |
| 3,796,059 | 3/1974 | Banikiotes et al. | 62/39 |

*Primary Examiner*—Norman Yudkoff
*Attorney, Agent, or Firm*—Sprung, Felfe, Horn, Lynch & Kramer

[57] ABSTRACT

A process for isolating dinitrogen monoxide from oxidation off-gases formed by the oxidation of a cycloalkanol or a cycloalkanone using nitric acid which off-gases contain dinitrogen monoxide in admixture with nitrogen oxide, nitrogen dioxide, nitrogen, oxygen, carbon dioxide and/or steam which comprises:

A. Drying the oxidation off-gas and if necessary removal of nitrogen monoxide, nitrogen dioxide and carbon dioxide.

B. Compressing the resultant off-gas from which water has been removed to a pressure in the range of 15 to 300 bars and cooling the same to a temperature in the range of 0° to −88° C.;

C. Removing the liquid phase obtained as a result of said compression and cooling; and D. Cooling the resultant gas phase by expansion and passing the same in indirect heat exchange with off-gas which has been prepurified by removal of water content thereof.

4 Claims, 2 Drawing Figures

PROCESS FOR ISOLATING DINITROGEN MONOXIDE

The present invention relates to a process for isolating dinitrogen monoxide from the oxidation off-gases formed during the oxidation of cycloalkanols and/or cycloalkanones using nitric acid.

In addition to dinitrogen monoxide, the oxidation off-gases formed during the preparation of dicarboxylic acids, for example adipic acid, by oxidation of the corresponding cycloalkanols and/or cycloalkanones also contain other gaseous constituents, such as nitrogen monoxide, nitrogen dioxide, nitrogen, carbon dioxide and steam.

In order to isolate dinitrogen monoxide, which can be used, for example, in large amounts as an anaesthetic, from the off-gases of the cycloalkanol/cycloalkanone oxidation, after most of the nitrogen monoxide and nitrogen dioxide has been removed it is possible, for example, to subject the oxidation off-gases to a pressure wash (Czechoslovakian Pat. No. 153,889 and 161,507).

However, this process is not very suitable for isolating dinitrogen monoxide since dinitrogen monoxide is only slightly soluble in water. Even under high pressure, only a few % by weight of dinitrogen monoxide dissolve in water, so that large amounts of water are required for absorbing the dinitrogen monoxide. Such a separation process would be uneconomical because of the large amounts of water which must be circulated, for example in a recycle procedure.

A process has now been found for isolating dinitrogen monoxide from the oxidation off-gases which are formed during the oxidation of cycloalkanols and/or cycloalkanones using nitric acid and which comprises dinitrogen monoxide, nitrogen monoxide, nitrogen dioxide, nitrogen, oxygen, carbon dioxide and steam, which is characterised in that the gas mixture is first freed from water, if necessary completely or partially from secondary constituents, such as nitrogen monoxide, nitrogen dioxide and carbon dioxide and the pre-purified oxidation off-gas is then compressed to pressures in the range from 15 to 300 bars and cooled to temperatures in the range from 0° to −88° C., the liquid phase thereby formed, which contains dinitrogen monoxide, is stripped off, the gas mixture which remains is cooled by expansion and the cooled gas mixture which has been largely freed from dinitrogen monoxide is used for cooling fresh oxidation off-gas.

The off-gases formed during the oxidation of cycloalkanols and/or cycloalkanones generally contain about 5 to 60% by weight of dinitrogen monoxide. The remainder predominantly consists of nitrogen and oxygen (about 40 to 90% by weight) and small amounts of, inter alia, nitrogen monoxide, nitrogen dioxide, carbon dioxide and water (about 60 to 10% by weight).

In order to isolate dinitrogen monoxide, it is appropriate to subject the oxiation off-gas to a pre-purification. The extent of this prepurification depends on the subsequent application of the dinitrogen monoxide. In all cases it is necessary to dry the oxidation off-gas; this can be carried out by the methods which are customary in industry such as, for example, by absorption of $SiO_2$ and/or by using molecular sieves or by washing with water-absorbent liquids as well as by cooling and by using combinations of the above.

An additional prepurification of the oxidation gas is necessary when the dinitrogen monoxide to be recovered is to be used as an anaesthetic.

The secondary constituents can thereby be removed from the gas mixture by known methods of gas purification, for example by alkaline or acid washing or by absorption (compare DT-AS (German Published Specification) No. 2,040,219).

If, for other chemical applications, very high purity of the dinitrogen monoxide is not demanded this pre-purification can be completely or partially omitted, since a proportion of the secondary products is isolated from the dinitrogen monoxide by the process of the invention.

The oxidation off-gas thus pre-purified, either merely dried or completely or partially freed from the other secondary constituents, called the starting gas mixture in the following text, is now compressed, in the process according to the invention, to about 15 to about 300 bars, preferably to 25 to 200 bars. The magnitude of the pressure applied depends firstly on the dinitrogen monoxide concentration in the gas mixture and then on how great the extent of the separation of the dinitrogen monoxide from the gas mixture should be. It generally applies here that high degrees of separation of dinitrogen monoxide can be achieved by high pressures, even if the original concentration of dinitrogen monoxide in the gas mixture is relatively low. The optimum ratio of pressure, dinitrogen monoxide concentration and degree of separation of dinitrogen monoxide can be easily determined by preliminary experiments.

In order to separate off the dinitrogen monoxide from the pre-purified oxidation off-gas, the compressed gas mixture is cooled to temperatures in the range from about 0° to about −88° C., preferably to −30° to −85° C. Dinitrogen monoxide is thereby obtained in the liquid form and can be removed as such. The remaining residual gas mixture which has been largely freed from dinitrogen monoxide is then used for cooling the starting gas mixture.

According to the invention, the cooling of the compressed starting gas mixture can be carried out in several stages. The procedure here can be to cool the residual gas mixture, which has been largely freed from dinitrogen monoxide, by expansion and to use it for cooling the compressed pre-purified gas mixture coming from the oxidation. The heat exchange is carried out in customary heat exchangers, advantageously in a countercurrent heat exchanger.

The cooling process can be described as follows. The gas mixture which has been largely freed from dinitrogen monoxide (residual gas mixture) and which comes from the first expansion stages is passed into the last heat exchanger, in which the compressed starting gas mixture is present. The warmed residual gas mixture now leaving the last heat exchanger is again expanded in the next expansion stage and is thus recooled. It is then used for further cooling of the starting gas mixture in the penultimate heat exchanger. This operation can be repeated several times until no further cooling of the residual gas mixture is effected by the expansion process.

The arrangement of several counter current heat exchangers, as described here by way of example, can also be conducted in such a way that several separated bundles of pipes are fitted inside a counter current heat exchanger, which charged with different gas streams, simultaneously cool the starting gas mixture (see Example 3).

If economical cold is available, this can be introduced into the process by connecting a refrigerating machine to the process. It is also possible to increase the degree of cold produced by the expansion by using an expansion turbine.

According to the invention, the procedure during the stepwise expansion of the residual gas mixture is such that the temperature of the residual gas mixture is in the range from about −86° C. to about −92° C., preferably at −89° C. to −91° C., in the first expansion. In the subsequent expansion stages, the temperature can be lower; the warmer the starting gas mixture to be cooled is at the coldest point in the heat exchanger concerned. The formula which follows can be used as the rule for the temperature $T_k$ of the expanded residual gas mixture which is to be appropriately maintained:

$$T_k = -176 - (T_w) \cdot T_k$$

wherein $T_w$(°C.) is the temperature, at the coldest point of the heat exchanger, of the starting gas mixture to be cooled.

BRIEF DESCRIPTION OF DRAWING

The process of the invention can be illustrated with the aid of the accompanying drawings in which.

DESCRIPTION OF SPECIFIC EMBODIMENT

Figure 1:
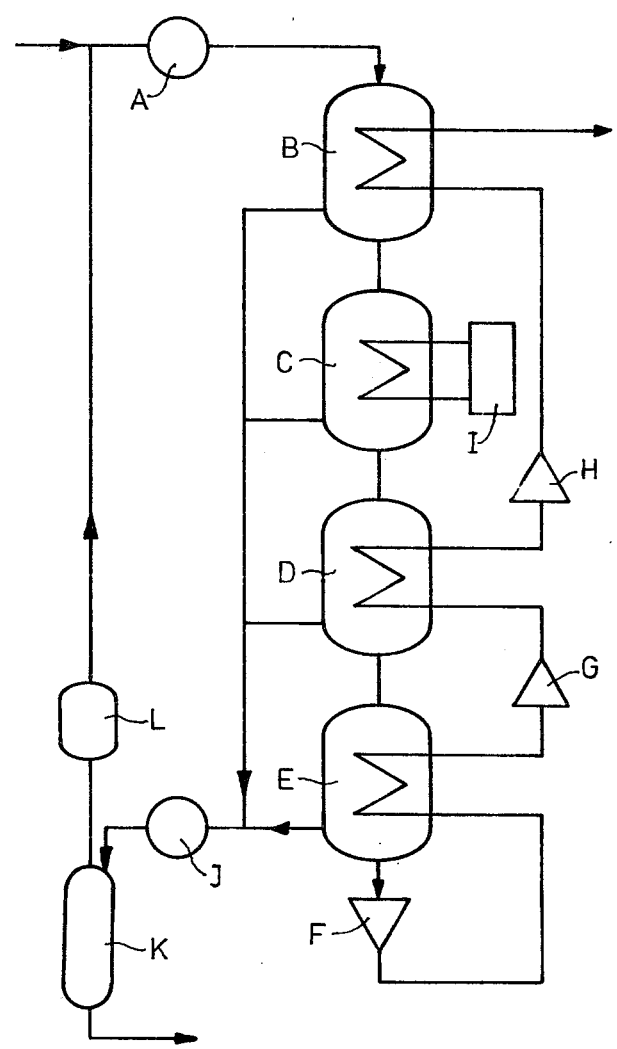
FIG. 1 is a flow diagram showing one mode of carrying out the process of the invention wherein steps are taken to remove $NO_x$ and $CO_2$ prior to passing the off-gas through a compressor and four heat exchangers are employed for cooling of the gases.

In carrying out the process of the invention where exceptionally high pure dinitrogen monoxide is desired, the gas to be purified is passed through an $NO_x$, $CO_2$ removal step where it is pre-purified. Thereafter, the pre-purified oxidation gas is treated in accordance with the invention.

The pre-purified oxidation off-gas coming from the oxidation of cycloalkanols and/or cycloalkanones is compressed in a compressor (A) and the heat of compression which thereby arises is removed. The starting gas mixture, which is under pressure, then passes through the countercurrent heat exchangers (B) to (E) connected in series and is thereby cooled to about −85° C. This liquid phase obtained in each heat exchanger (B) to (E) is fed to the collecting vessel (J). The residual gas mixture which is under pressure and has been largely freed from dinitrogen monoxide is expanded in the expansion vessel (F) to such an extent that the temperature in the expansion vessel (F) does not fall below a range from −88° to −91° C. The cooled and partially expanded residual gas mixture is then fed to the countercurrent heat exchanger (E) and thereby cools the compressed starting gas mixture present in (E) to such an extent that dinitrogen monoxide is separated out from the gas mixture. The residual gas mixture, which has now been formed, is again expanded in the expansion vessel (G), down to a temperature which can be determined by the formula indicated above. Renewed heat exchange in the heat exchanger (D), expansion in the expansion vessel (H) and heat exchange again in the heat exchanger (B) take place. As is known, the generation of cold which can be produced by expanding the compressed gas mixture depends above all on the pressure of the gas mixture, the material properties of the substances present in the gas mixture also playing a part (compare R. Plank, Handbuch der Kältetechnik (Handbook of Low-Temperature Engineering), Volume 8, 5–96).

It can be assumed that in the case of gas mixtures containing about 20% by weight of dinitrogen monoxide, by compression to more than 200 bars, a cooling capacity which is sufficient to cover the cold requirement for isolating most of the dinitrogen monoxide can be obtained by expansion. If the cold requirement is greater than that which can be made available by the expansion process, it is appropriate to cover the additional cold requirement by using refrigerating machines and/or expansion turbines.

Thus, for example, the countercurrent heat exchanger (C) is in contact with the refrigerating machine (I). The expansion stage (H) can also be realised with the aid of an expansion turbine.

The liquid phase which has condensed out in the heat exchangers (B) to (E) and enters the collecting vessel (J) essentially consists of dinitrogen monoxide (about 90 to 99% by weight). Apart from this, amounts of the secondary substituents are also dissolved in the liquid phase (approx. 1–10% by weight).

If one starts with an initial gas mixture which has been freed from nitrogen monoxide, nitrogen dioxide and carbon dioxide, the liquid phase then contains only oxygen and nitrogen as impurities.

In order to remove these gases dissolved in the liquid phase, the mixture is expanded in a distillation column (K) and the liquid phase is freed from oxygen and nitrogen in this column by distillation.

It can be appropriate in some cases to condense in the condenser (L) only some of the vapours coming from the distillation column (K) and to recycle only the residual gases into the process via compressor (A). In general, the pressure in the distillation column (H) is adjusted so that it is in the range from about 1 to 20 bars, preferably in the range from 5 to 15 bars.

If the aim of the process is to recover $N_2O$ containing secondary products the distillation column (K) can be omitted and replaced by a expansion container. The gases formed during this can be reintroduced into the process via the compressor (A).

The Examples serve to illustrate the process according to the invention without restricting it to these Examples.

EXAMPLE 1

100 kg of a gas mixture consisting of $N_2O$, $N_2$ and $O_2$, which contains 27% by weight of $N_2O$, are compressed to a pressure of 60 bars and cooled to a temperature of 30° C. This compressed gas is pumped into 5 heat exchangers connected in series, in which it is cooled down to −85° C. 26.4 kg of crude $N_2O$ are condensed and are fed to the head of a distillation column which is under a pressure of 15 bars. 25.4 kg of pure dinitrogen oxide are removed at the sump of this column.

The gas escaping from the head of the distillation column is recycled to the process.

The residual gas mixture which has been largely freed from the liquid constituents is removed from the last heat exchanger and expanded to 46 bars. It thereby cools to −90° C. This gas is now used for countercurrent cooling of the high pressure gas in the 5th heat exchanger.

Further expansions of the residual gas mixture which has been largely freed from $N_2O$ are effected during transfer from the 5th to the 4th and from the 3rd to the last heat exchanger. The pressures which are thereby set up are 30, 10 and 1 bars.

The following temperatures are set up in the starting gas mixture at the cold ends of the countercurrent heat exchangers (HTE):

| HTE | |
|---|---|
| 1 | 5° C. |
| 2 | −59° C. |
| 4 | −72° C. |
| 5 | −85° C. |

In comparison, in the residual gas mixture these are:

| HTE | |
|---|---|
| 1 | −79° C. |
| 3 | −84° C. |
| 4 | −82° C. |
| 5 | −88° C. |

The gas mixture is cooled to −55° C. in the 2nd heat exchanger by means of a refrigerating machine.

EXAMPLE 2

The dinitrogen oxide is separated out of 2 further gas mixtures, which contain $N_2O$, $O_2$ and $N_2$, by the process of Example 1. The following tables give the information on the experimental parameters:

| | Gas mixture: | | |
|---|---|---|---|
| | A | B | |
| % by weight of $N_2O$ | 50.6 | 10 | |
| pressure in the starting gas mixture | 45 | 150 | bars |
| starting gas mixture feed | 124 | 100 | kg/hour |
| amount of $N_2O$ at the bottom of the distillation column | 58 | 8.3 | kg/hour |
| exit temperature of the residual gas mixture in the last heat exchanger | −85° C. | −75° C. | °C. |

| Temperatures and pressure in the heat exchangers | | | | | |
|---|---|---|---|---|---|
| | Gas mixture A | | | | |
| | HTE 1 | 3 | 4 | 5 | |
| temperature (cold end) starting gas mixture | 20 | −59 | −72 | −81 | °C. |
| residual gas mixture | −78 | −80 | −75 | −83 | °C. |
| pressure in the residual gas mixture | 1.3 | 10.1 | 30 | 44 | bars |
| | Gas mixture B | | | | |
| temperature in the starting gas mixture (cold end) | 19 | −58 | −66 | −75 | °C. |
| temperature in the residual gas mixture (cold end) | −87 | −104 | −86 | −77 | °C. |
| pressure in the residual gas mixture | 1 | 14 | 50 | 133 | bars |

EXAMPLE 3

Figure 2:
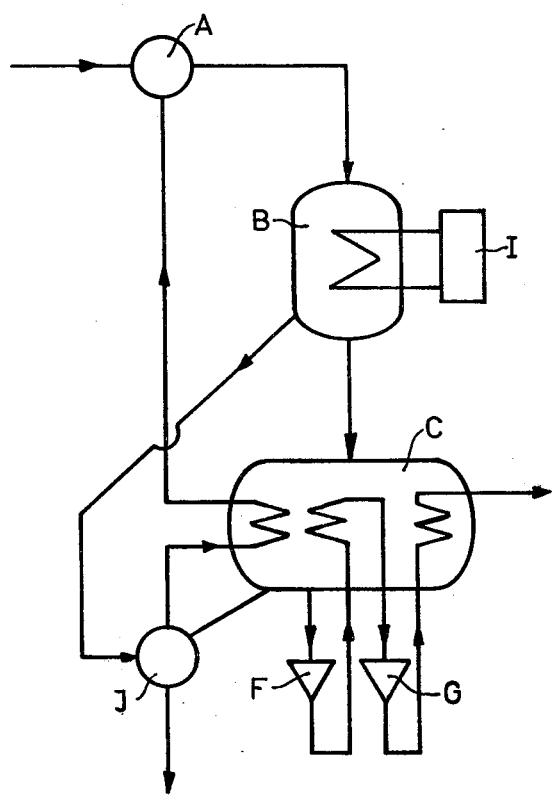
FIG. 2 is another flow diagram showing another mode for carrying out the invention in which fewer heat exchangers are employed and expanded gases are several times brought into indirect heat exchange in one of the heat exchangers with entering gases to be cooled.

78 kg of a gas mixture consisting of 65% of $N_2O$, 5% of $NO_x$, 4% of $CO_2$ and 26% of nitrogen are compressed to 27 bars and cooled to −45° in the heat exchanger B (cf FIG. 2) with the aid of a refrigerating machine. The liquid phase forming here is introduced into the collecting vessel J. This starting gas mixture is cooled further in the heat exchanger C. The quantity of heat necessary for this is produced by multiple-stage expansion of the remaining starting gas mixture following the separation of the liquid phase obtained.

The remaining starting gas mixture enters the expansion container F at a temperature of −51° and the pressure is released there to 14.6 bars. At the same time it cools to −81°. This gas is introduced into the counter current heat exchanger C. It warms up during this and is expanded to 2 bars in the expansion container G. The temperature drops to −80° during this process. This cold gas stream is also introduced into the heat exchanger C.

The liquid running into the collecting container J from the heat exchangers B and C is expanded to normal pressure. The gas quantity forming during this is also used for cooling the gas mixture in the heat exchanger C. This gas mixture, having a high content of $N_2O$, can be reintroduced into the process via the compressor A.

50 kg of dinitrogen monoxide are extracted from the collecting vessel B and contain 1.7% by weight of $NO_x$ and 5% by weight $CO_2$.

What is claimed is:

1. A process for isolating dinitrogen monoxide from oxidation off-gases formed by the oxidation of a cycloalkanol or a cycloalkanone using nitric acid which off-gases contain dinitrogen monoxide in admixture with nitrogen oxide, nitrogen dioxide, nitrogen, oxygen, carbon-dioxide and/or stream which comprises:
   A. Drying the oxidation off-gas;
   B. Compressing the resultant off-gas from which water has been removed to a pressure in the range of 15 to 300 bars and cooling the same to a temperature in the range of 0° to −88° C.;
   C. Removing the liquid phase obtained as a result of said compression and cooling; and
   D. Cooling the resultant gas phase by expansion and passing the same in indirect heat exchange with off-gas which has been prepurified by removal of water content thereof.

2. A process according to claim 1 wherein the off-gas which has been prepurified to remove water is passed through successive zones maintained at 15 to 300 bars pressure and at a temperature in the range from 0° to −88° C.

3. A process according to claim 2 wherein the gas mixture obtained after removal of the liquid phase is passed through said successive zones in a generally inverse order to the passage of prepurified off-gas.

4. A process according to claim 1 wherein prior to step B nitrogen monoxide, nitrogen dioxide, and carbon dioxide are removed from the off-gas.

* * * * *